J. CARLSON.
SPRINKLER.
APPLICATION FILED SEPT. 16, 1920.
1,380,769.
Patented June 7, 1921.
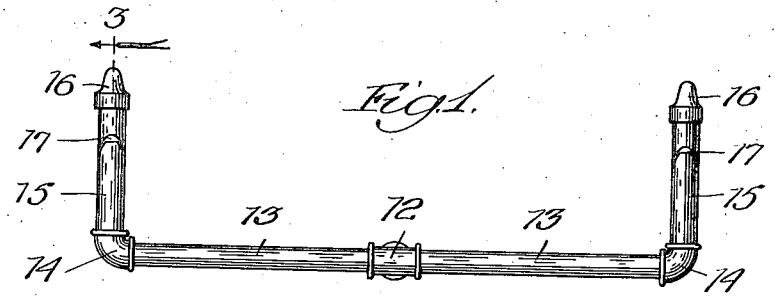
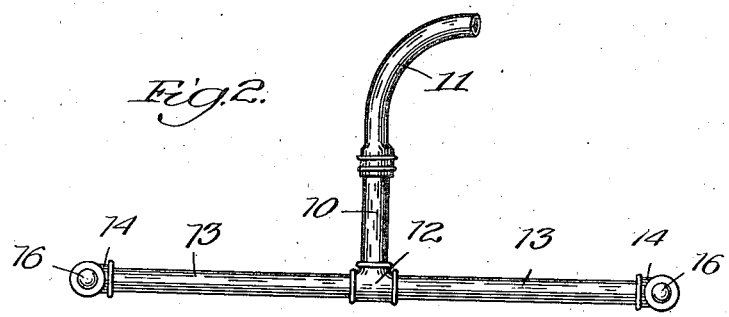
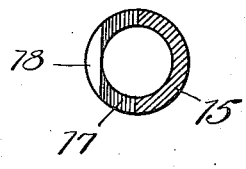
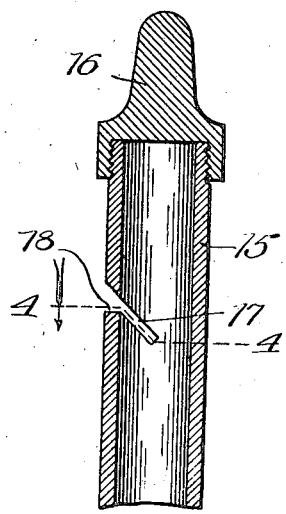
Inventor:
John Carlson,
By Dyrenforth, Lee, Chritton and Wiles
Att'ys

UNITED STATES PATENT OFFICE.

JOHN CARLSON, OF CHICAGO, ILLINOIS.

SPRINKLER.

1,380,769.  Specification of Letters Patent.  Patented June 7, 1921.

Application filed September 16, 1920. Serial No. 410,578.

*To all whom it may concern:*

Be it known that I, JOHN CARLSON, a subject of the King of Sweden, residing at 6758 Clyde Ave., Chicago, in the county of Cook and State of Illinois, have invented a new and useful Improvement in Sprinklers, of which the following is a specification.

This invention relates to sprinklers and is fully described in the following specification and shown in the accompanying drawings in which:

Figure 1 is a front elevation of a sprinkler embodying my invention;

Fig. 2 is a plan view of the same;

Fig. 3 is an enlarged partial section on the line 3 of Fig. 1; and

Fig. 4 is a section on the line 4 of Fig. 3.

In the embodiment shown, the lawn sprinkler comprises a horizontal pipe 10 attached at one end to a hose 11 which is connected to a source of water supply, and at the other screwed into a T 12. Horizontal pipes 13 are screwed into the ends of the T. Elbows 14 are screwed on the outer ends of the pipes 13 and vertical pipes 15 are screwed into the elbows. Caps 16 serve to plug the upper ends of these pipes. The T 12, the pipes 13 and the elbows 14 thus form a header into which the vertical pipes 15 and the horizontal pipe 10 are secured.

A downwardly and backwardly extending slot 17 is formed in the vertical pipe 15 and is relieved at 18 as shown in Fig. 3.

By relieving this slot as at 18 eddy-currents and cross-currents are produced in the emerging stream which tend to break it up and scatter it in all directions from the edge of the slot. The effect is thus to scatter more water over a limited area and not to throw it so far as would be the case were the discharge slot of uniform width throughout its length.

While I have shown and described but a single embodiment of my invention, it is to be understood that it is capable of many modifications. Changes, therefore, may be made which do not depart from the spirit and scope of my invention as disclosed by the appended claim, in which it is my intention to cover all novelty inherent in my invention as broadly as possible in view of the prior art.

What I claim as new and desire to secure by Letters Patent is:

A lawn sprinkler comprising a tube having a diagonal slot formed in one side thereof, the shorter side of said slot being relieved.

JOHN CARLSON.